United States Patent [19]

Buisson et al.

[11] Patent Number: 4,805,580

[45] Date of Patent: Feb. 21, 1989

[54] FUEL INJECTION DEVICE

[75] Inventors: Dominique Buisson, Villeurbanne; François Henry, Ste Foy les Lyon; Jean Leblanc, Lyons, all of France; Helmut Pfeifle, Stuttgart, Fed. Rep. of Germany; Jean Pigeroulet, Villeurbanne, France

[73] Assignee: Robert Bosch GmbH, Stuttgart, Fed. Rep. of Germany

[21] Appl. No.: 870,468

[22] Filed: Jun. 4, 1986

[30] Foreign Application Priority Data

Jun. 14, 1985 [DE] Fed. Rep. of Germany ....... 3521427

[51] Int. Cl.$^4$ ............................................. F02M 39/00
[52] U.S. Cl. .................................... 123/506; 123/446; 123/447; 123/467
[58] Field of Search ............... 123/506, 446, 467, 447, 123/458, 496

[56] References Cited

U.S. PATENT DOCUMENTS

| 2,421,475 | 6/1947 | Beeh | 123/506 |
| 2,628,570 | 2/1953 | De Luca | 103/154 |
| 4,129,256 | 12/1978 | Bader | 123/506 |
| 4,158,442 | 6/1979 | Rothmayr | 239/88 |
| 4,554,903 | 11/1985 | Straubel | 123/446 |
| 4,622,942 | 11/1986 | Nozaki | 123/446 |

FOREIGN PATENT DOCUMENTS

| 2743244 | 4/1978 | Fed. Rep. of Germany . | |
| 8321888 | 10/1984 | Fed. Rep. of Germany . | |
| 0051139 | 3/1984 | Japan | 123/506 |
| 0190465 | 10/1984 | Japan | 123/506 |

Primary Examiner—Carl Stuart Miller
Attorney, Agent, or Firm—Edwin E. Greigg

[57] ABSTRACT

A fuel injection device having a pump piston which during the supply stroke pumps fuel from a pump work chamber into an injection line which leads to a fuel injection valve. Directly adjacent to the branching off of the injection line from the pump work chamber, at the diameter of the injection line, a valve seat is provided, at which the injection line then merges with a chamber into which a pressure valve closing member plunges. The valve closing member is tightly guided in a guide bore, loaded by a valve spring, and in the chamber has a pressure shoulder adjoining the sealing surface that cooperates with the valve seat. The rear side of the pressure valve closing member communicates with a continuously open relief line. Because of this construction, the pressure valve closing member operates as an equal-pressure valve and simultaneously as a deflecting piston as well, with the aid of which a pressure rise in the pump work chamber is built up in a retarded manner until such time as the pressure valve closing member comes to rest on a stop. A pressure rise of this type is particularly advantageous in connection with control of the injection phase by means of a magnetic valve subjected to the high pressure.

2 Claims, 3 Drawing Sheets

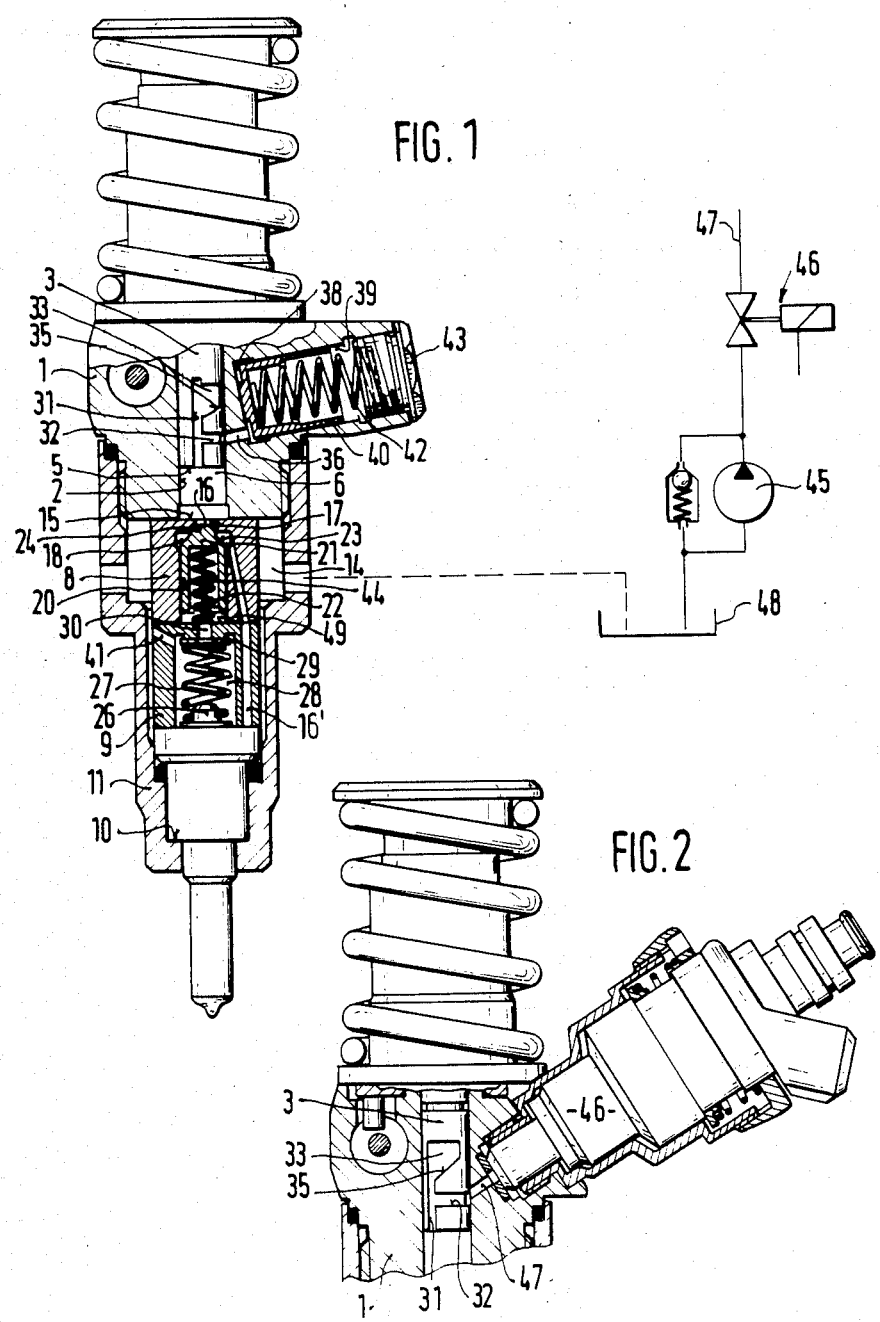

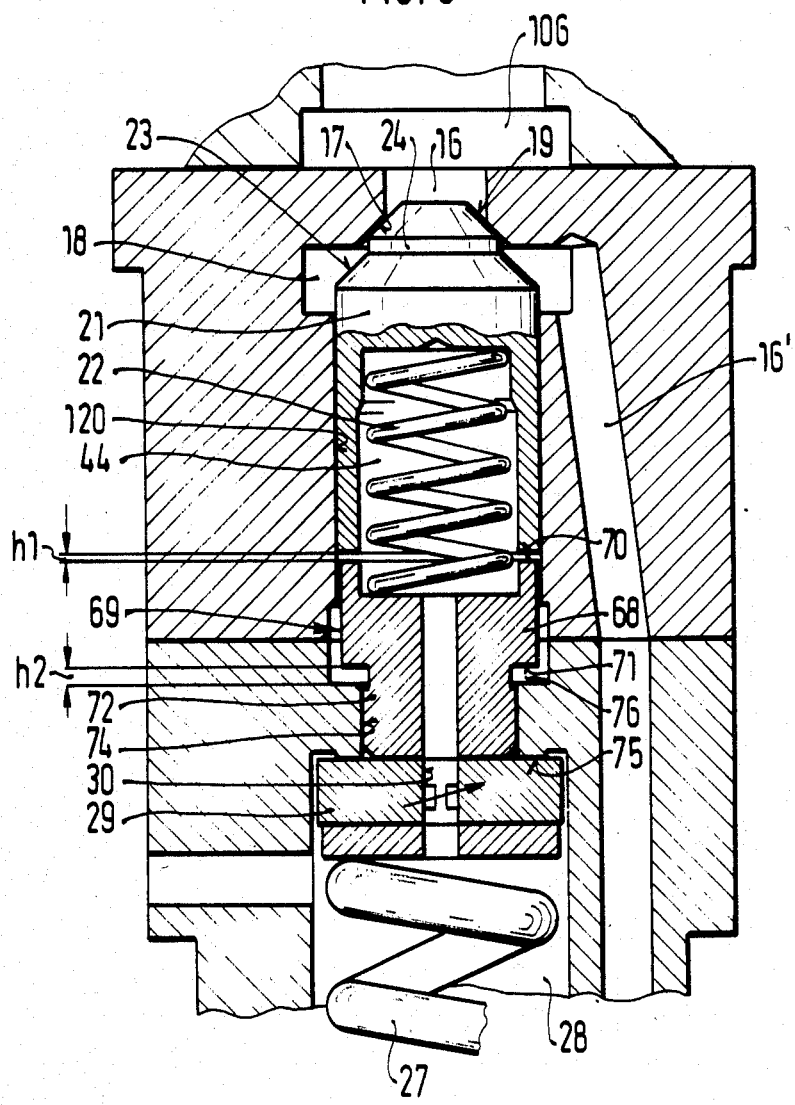

FUEL INJECTION DEVICE

BACKGROUND OF THE INVENTION

The invention relates to a fuel injection apparatus as defined hereinafter. In a fuel injection device of this type, known from German Utility Model No. DE-GM 83 21 888, the flow control device is embodied as a slide valve, and the pump piston serves as the movable valve member. With an oblique control edge on its jacket face, this pump piston causes the outlet of the relief conduit on the circumferential wall of the pump cylinder to communicate with the pump work chamber beyond a pump supply stroke that is defined by the rotational position of the pump piston. In this way, the rotational position of the pump piston determined the quantity of fuel attaining injection at high pressure per pumping stroke. Fuel injection devices of this type are embodied in particular, as also shown in the above patent document, as units comprising a fuel injection pump and fuel injection valve, with a very short pressure line, of stable shape, located between the pump work chamber and the injection valve opening; they are used for attaining accurate injection even with internal combustion engines which operate at very high speeds and in which there is direct injection into the combustion chambers. In such engines, in order to attain good fuel preparation within the abbreviated time that is available for ignition delay and combustion of the injected fuel in this case, it is necessary to assure accurate and very fast control of the injection valve closing member and also, for the sake of better atomization of the injected fuel, to operate at an elevated injection pressure.

In the known fuel injection apparatus, furthermore, a pressure valve having a closing member is provided in the injection line leading on from the pump work chamber to the injection port of the injection valve. The closing member is cylindrical, with a pressure shoulder adjacent to the valve seat face, and it is acted upon from behind by a valve spring. The rear side, toward the valve spring, of the pressure valve closing member in this case communicates with the fuel injection line leading from the pressure valve closing member valve seat to the injection port; this is also the case, for example, in a unit fuel injector known from U.S. Pat. No. 4,158,442. The pressure valve closing members disclosed in these patent documents cannot function as equal-pressure valves, because in any case after the effective pump supply stroke has ended, with the pressure valve closing member located in its closing position, the pressure surface of the pressure valve closing member acting in the closing direction is larger than the one acting in the opening direction. Additionally, the pressure valve closing member is also urged in the closing direction by the valve spring. Injection devices of thie type have the disadvantage that at the end of the effective supply storke, immediately after the closure of the pressure valve closing member, pressure waves may flow back and forth in the fuel injection line between the pressure valve closing member and the injection port of the fuel injection valve, which can result in the brief opening of a fuel injection valve closing member that opens under pressure. As a result, after the intended end of the fuel injection process, some fuel is delivered to the combustion chamber belatedly and thus no longer burns, causing carbonization of the injection ports of the fuel injection valve. This process also contributes to an incorrect fuel injection quantity.

At the injection onset, in the known fuel injection devices discussed above the pressure valve closing member is deflected only far enough that the fuel positively displaced by the pump piston can flow past the valve closing member in such quantities as emerged at the injection port of the fuel injection valve after the valve closing member rose from its seat.

OBJECT AND SUMMARY OF THE INVENTION

The fuel injection device according to the invention has the advantage over the prior art that the pressure valve closing member operates both as an equal pressure valve and as a deflecting piston, with the aid of which latter it is possible, at injection onset, to reduce the pressure increase rate relative to the geometrically dictated rate of increase until such time as the pressure valve closing member reaches its seat. Since the rear side of the pressure valve closing member is acted upon by a lower-level pressure which is independent of the pressure in the pump work chamber, the deflecting movement and deflection speed of the pressure valve closing member is determined in the final analysis substantially by the force of the valve spring, in combination with the end face acted upon by high pressure.

By modifying the pressure on the valve spring side and/or by throttling the fuel volume positively displaced by the deflecting movement of the valve closing member, it is also possible to vary the movement characteristic or the displacement rate of the pressure valve closing member.

Contrarily, from the end of fuel supply on the pressure valve closing member acts in a known manner as an equal pressure valve, which is opened up toward the now-releived pump work chamber at peak levels by means of the pressure waves that act via the pressure shoulder. This prevents re-opening of the fuel injection valve.

With an advantageous further embodiment according to this disclosure it is attained that in fuel injection pumps having a fuel quantity control as defined herein, the pressure does not rise steeply, in the way the pump piston is moved by its drive cam, but instead is retarded by the deflecting movement of the pressure valve closing member. The closing member of the electrically controlled valve is acted upon by a lesser pressure at the moment of closure of this valve, which raises the closing speed and reduces the required closing force that the valve must exert. Since an electrically controlled valve serves as a quantity control means and simultaneously serves to control injection times, the pump piston, over the range of adjustment of the instant of injection, executes a stroke during which it pumps fuel out of the pump work chamber back to the supply fuel pressure source. To attain rapid switching of the electrically controlled valve, however, its stroke and opening cross section cannot be made arbitrarily long and wide, respectively, so that an elevated pressure can build up during this initial phase of fuel delivery up to the injection onset. With the aid of the displacement volume of the pressure valve closing member, however, it is possible to reduce this pressure increase, which in turn has a positive effect on the closing speed, that is, on the structure and closing energy for the electrically controlled valve. This effect is particularly advantageous in a fuel injection device because in this case the pressure that builds up in the pump work chamber up until the actual injection onset can also act upon the sealing face in the opening direction of the needle valve. By adapting the displacement volume and the displacement rate of the pressure valve closing member to the movement characteristic of the closing member of the magnetic valve, the closing speed of the magnetic valve can be optimized and the closing energy reduced. Factors that must be taken into account here are the opening cross section of the relief line when the magnetic valve is fully open, the pump piston supply rate and the surfaces of the valve closing member of the magnetic valve that are acted on by pressure, the holding pressure of the pressure valve, and the course of force of the magnetic valve.

Further advantageous embodiments are also defined herein. Fuel injection devices which operate at high speed at described at the outset herein are conceived for the purpose of injecting fuel at high fuel injection pressure up to the end of injection, and thereafter to effect a very fast closure of the valve closing member of the fuel injection valve; in such fuel injection devices it can happen that the pressure valve closing member is incapable of following up this rapid pressure drop in the pump work chamber and so reaches its valve seat in a retarded manner. In this range, however, it is possible that the space between the pressure valve closing member and the injection valve closing member may be evacuated partially or completely. The degree of evacuation depends on dynamic conditions, which means that there may be considerable variation in the pressure status inside the injection line after the pressure valve closing member. In the ensuring fuel injection event, these spaces must be refilled with the metered fuel pumped by the pump piston, which can result in variations in the fuel injection quantities and in pressure fluctuations upon refilling caused by a high-pressure wave in the fuel injection line. These disadvantages are overcome by providing a constant level of equalized pressure in the injection line after the pressure valve closing member.

A further particularly advantageous embodiment of this invention has the advantage that the communication between the pump work chamber and the fuel injection line is interrupted immediately after the stroke onset of the pump piston, so that dynamic factors do not come into play.

Still another embodiment according to the invention, on the other hand, is considerably simplified by comparison. Differing from the above embodiment, the pressure in the fuel injection line between the fuel injection valve closing member and the pressure valve closing member is elevated relative to the supply pressure during the process of displacing fuel out of the pump work chamber at the beginning of the pump piston supply stroke. At the instant the magnetic valve closes, the already prevailing force upon the pressure valve closing member, which acts in the opening direction, is greater than in the foregoing embodiment, so that only a slight pressure increase in the pump work chamber is needed to open the pressure valve closing member, given the same dimensions and the same spring force. This has the advantage that when the pressure valve closing member opens there is no pressure difference in the adjoining fuel injection line with respect to the pressure in the pump work chamber, and so pressure fluctuations are not brought about.

Another embodiment of the invention has the advantage that with the partial strokes of the pressure valve closing member, a two-stage opening of the pressure valve is attained, and during the opening stroke counter to the force of the first spring, a defined pressure is introduced into the fuel injection line downstream of the pressure valve closing member. The second partial stroke counter to the second spring then affects the pressure increase upon closure of the magnetic valve, particularly during the closing process of the magnetic valve. Advantageously, as revealed herein, the valve closing spring can serve as the second spring, so that no additional spring, as in known embodiments, must be provided.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1 shows a first exemplary embodiment having a fuel injection device in the form of a unit fuel injector seen in fragmentary section;

FIG. 2 is a fragmentary section, offset in its rotational position from FIG. 1, taken through the exemplary embodiment of FIG. 1;

FIG. 6 shows a cross-sectional view of fifth exemplary embodiment, having a pressure valve with a two-stage opening characteristic in order to attain a pressure equilibrium in the injection line in the first opening phase.

DESCRIPTION OF THE PREFERRED EMBODIMENTS

Figure 3:
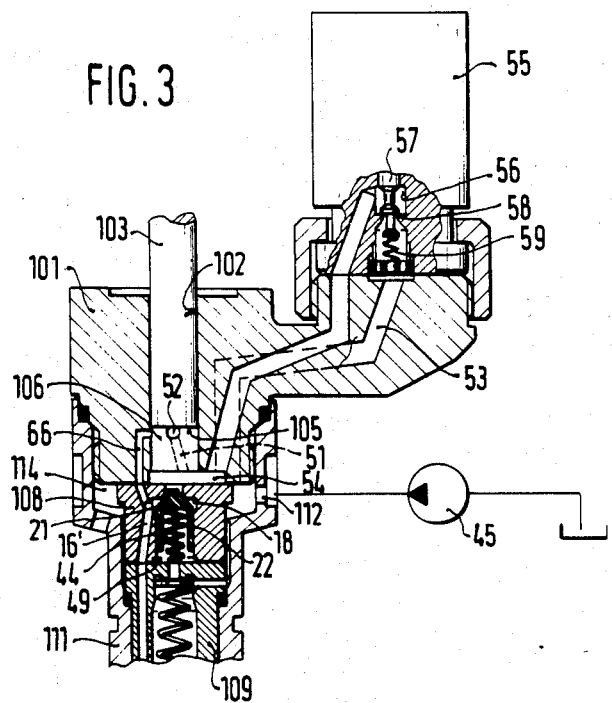
FIG. 3 shows a second exemplary embodiment, in the form of a fragmentary section taken through a unit fuel injector having a modified magnetic valve acting to control the fuel quantity.

FIG. 1 shows a unit fuel injector in fragmentary section, as a first exemplary embodiment in the form of a fuel injection device; elements not essential to the invention have been left out of the drawing. In a pump housing 1, a pump cylinder 2 is provided, in which a pump piston 3 is set into a reciprocating, pumping movement by a drive cam, not shown in further detail. With its end face 5, the pump piston encloses a pump work chamber 6 in the pump cylinder 2 that is closed at its end. The end closure of the pump cylinder 2 is effected via an intermediate piece 8, which coaxially adjoins a fuel injection valve 9, which is pressed tightly against the intermediate piece 8 by a retaining nut 11 arranged to engage a shoulder 10 of the fuel injection valve, which forms the housing unit of the unit fuel injector. The retaining nut is screwed to the pump housing 1 and in its interior, together with the jacket face of the intermediate piece 8, it forms a low-pressure chamber 14, which communicates with the low-pressure side of the fuel supply.

Leading away from the end face 16 of the pump cylinder 2 is an injection line 16', the flowthrough cross section of which, immediately adjacent to the pump work chamber, is defined by a conically shaped valve seat 17; adjacent to this valve seat, the injection line discharges into an annular chamber 18, from where it leads through the intermediate piece 8 and in a known manner to the injection valve 9.

Figure 5:
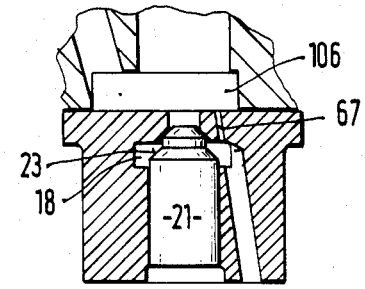
FIG. 5 shows a cross-sectional view of fourth exemplary embodiment, having a throttle connection, located parallel to the pressure valve, between the pump work chamber and the injection line.

The outlet of the injection line from the pump work chamber as well as the conical valve seat are located coaxially with respect to the axis of the pump piston. The chamber 18 is also coaxially adjoined by a guide cylinder 20, having a diameter larger than the outermost diameter of the conical valve seat 17. A pressure valve closing member 21 is tightly displaceable in the guide cylinder, being loaded on its rear side by a valve seat spring 22 which is supported on the end face of the guide cylinder. The cylindrical pressure valve closing member 21, as shown, is arranged to protrude into the chamber 18 and at this point it is provided with a knob-like portion thereby forming a pressure shoulder 23 as shown in FIG. 5. The knob-like portion 24 has a conical sealing face to match the valve seat 17. By means of the valve spring, the pressure valve closing member is retained on the conical seat 17, and thereby closes the connection via the injection line between the pump work chamber 6 and the injection valve 9.

The injection valve, for instance in a known manner, has an inwardly opening valve needle, not shown further here, and the valve needle has a pressure shoulder, as shown in FIG. 5, against which the fuel, now at high pressure, is directed via the injection line 16'; by this means, the valve needle is actuatable in the opening direction. Acting in the closing direction on the valve needle, via a spring plate 26 located at the end of the valve needle, is the force of a pre-stressed valve closing spring 27, which is disposed in a valve spring chamber 28 of the injection valve and is supported on its opposite end, via a spring plate 29, on the end of the spring chamber 29 nearer the end face. The cylindrically embodied spring chamber, like the axis of the valve needle of the injection valve, is coaxial with the axis of the pump piston 3, and communicates via a coaxial conduit 30, which also passes all the way thorugh the spring plate 29, with a spring chamber 44 enclosed in the guide cylinder by the back side of the pressure valve closing member, and also simultaneously communicates via an opening 41 with the low-pressure chamber.

The pump piston 3 has a longitudinal groove 31 in its jacket face that joins the pump work chamber to an annular or partial annular groove 32. The longitudinal groove 31 also joins the pump work chamber to a recess 33 in the jacket face of the pump piston; on the side remote from the pump work chamber, this recess 33 has a limiting edge at right angles to the pump piston axis, while toward the pump work chamber it has an obliquely extending limiting edge 35 embodied as a control edge. In the end position of the pump piston shown, at the end of the intake stroke (i.e., bottom dead center), the partial annular groove 32 communicates with the opening of a relief conduit 36, which leads form the pump cylinder 2 to a storage chamber 38. This chamber is embodied by a cylinder 39, in which a piston, embodying a movable wall, is disposed in a tightly displaceable manner; a compression spring 42 is supported on the rear side of this piston and on its other end rests on a closure plug 43 that closes the cylinder 39.

In FIG. 2, which shows a section through the exemplary embodiment of FIG. 1 but a different rotational position, a magnetic valve 46 is shown, which with its closing member, not shown in detail here, controls the communication between a fuel supply line 47 and a fuel supply source. This source is a low-pressure source, in this case comprising a supply pump 45 shown in FIG. 1, which aspirates fuel from a fuel supply container 48, its pumping pressure being determinable by a pressure control valve. The fuel supply line 47 discharges into the cylinder 2 in the vicinity of the partial annular groove 32, whenever the pump piston 3 is at the end of its intake stroke in the bottom dead center position shown.

During operation, in the case of the unit fuel injector shown in FIG. 1, the pump piston 3 is set into reciprocating pumping motion. In the initial position shown, at bottom dead center, the piston 40, which defines the storage chamber 38, has introduced the contents of this storage chamber into the pump work chamber 6. Additionally, a predetermined fuel quantity is metered into the pump work chamber 6 via the magnetic valve. Upon the ensuing pumping or supply stroke of the pump piston, the relief conduit 36 is closed by the jacket face of the pump piston, and it remains closed until such time as it is reopened by the oblique control edge 35. In the intervening stroke, the pump piston pumps the positively displaced fuel at high pressure into the injection line 15, raising the pressure valve closing member 21 from its seat. The injection pressure engaging the valve needle opens the fuel injection valve, and fuel flows out into the adjacent combustion chamber of the engine. At the instant when the relief conduit 36 is opened by the control edge 35, the fuel, which now is positively displaced still further, flows into the storage chamber 38, where it can expand again. At that moment, the pumping of fuel out of the pump work chamber 6 into the injection line 16' or toward the opening of the injection valve is interrupted. The peaks of the pressure waves that subsequently flow back and forth upon the closure of the injection line in the area between the valve seat 17 and the injection valve opening, can be diminished in that the pressure valve closing member, being loaded on its pressure shoulder 23, re-opens and relieves the injection line 16' toward the pump work chamber 6, which is now at a lower pressure level. This pressure level is determined by the spring force acting upon the piston 40 and is markedly lower than the injection pressure but higher than the pressure of the fuel supply source. Thus, at the beginning of each of the successive pumping strokes, in the area between the pressure valve closing member and the injection valve opening or injection valve closing member, the same initial pressure prevails; this prevents fluctuations in the fuel injection quantities, or in other words increases the accuracy of injection.

Up to the end of the supply stroke movement of the pump piston, the fuel that continues to be positively displaced after the relief conduit opening has been overtaken is pumped into the storage chamber 38. In the ensuing intake stroke, part of this remaining positively displaced fuel is first pumped back into the pump work chamber, as long as the mouth of the relief conduit is located in the vicinity of the recess 33; contrarily, the remainder of the stored fuel at bottom dead center s pumped into the pump work chamber via the partial annular groove 32. At the instant this last-mentioned connection is established, the pressure level in the pump work chamber has been lowered considerably, which promotes the transfer of fuel out of the storage chamber 38. The quantity of fuel introduced in this manner into the pump work chamber is determined by the rotational position of the pump piston, or by the stroke beyond which the relief conduit is opened up by the oblique control edge. Next, via the magnetic valve, the quantity of fuel intended for the next fuel injection event is metered. Together with the quantity of fuel already located beforehand in the pump work chamber, the moment of the injection onset is then attained, at which moment the pressure in the pump work chamber is elevated to such an extent that the opening pressure of the injection valve is also attained. With this type of unit fuel injector, it is thus substantially the rotational position of the pump piston that determines the injection onset.

At injection onset, in order to begin the fuel injection the pressure valve closing member 21 must first be moved out of its closing position. In this process, a small pressure surface initially acts on the valve closing member, being on the order of magnitude of the flow cross section of the injection line toward the pump work chamber, and additionally the remaining pressure in the fuel injection line 16 acts upon the pressure shoulder 23. Reinforcing the valve spring 22, the low pressure acts upon the rear side of the pressure valve closing member. Once the valve closing member has lifted from the valve seat 17, contrarily, the fuel pressure is exerted upon the entire cross section, which results in a noticeably faster deflection of the pressure valve closing member 21. As a result, a displacement volume is made available, which initially retards the continuing fuel pressure rise; in the illustrated embodiment, this is simultaneously associated with an initially lower injection rate. This is advantageous because, among other reasons, fuel is initially retarded in its introduction into the combustion chamber, since at injection onset a delay in ignition must be expected. Thus an abrupt ignition of an overly large quantity of fuel at the end of this ignition delay period is avoided, thereby preventing undesirable combustion noise (knocking, pinging). The deflection stroke of the pressure valve closing member 21 is determined by its stop 49 at the end of the guide cylinder 20; the stroke of the pressure valve closing member is adapted to the effects sought. The fuel volume positively displaced by the pressure valve closing member during the opening process is returned via the conduit 30 to the storage chamber. The conduit 30 itself, or a portion of it, may also be embodied as a throttle. This throttle, together with the characteristic of the valve spring 22 and the diameter of the pressure valve closing member, in addition to the pumping characteristic of the pump piston, determines the deflection speed of the pressure valve closing member, since during its deflection this element compresses fuel on its rear side. Thus by adjusting the throttle in accordance with operating parameters, a further option of varying the injection course at injection onset is obtained. Varying the low-pressure level is another possible option. However, varying the fuel pressure rise is highly advantageous in the embodiments described below in connection with FIGS. 3 and 4.

In the exemplary embodiment of FIG. 3, as in FIG. 1, a unit fuel injector is shown. This embodiment has a pump housing 101, in which a pump cylinder 102 is provided. A pump piston 103 is disposed in the pump cylinder 102 and is set into reciprocating pumping motion by a drive cam, not shown. With its end face 105, the pump piston encloses a pump work chamber 106 in the pump cylinder 102; on its other end, the pump work chamber is closed by the intermediate piece 108 shown in FIG. 1. This element is pressed tightly against the housing 101 by the retaining nut 111 and the fuel injection valve 109. A low-pressure chamber 114 is formed between the retaining unit 111 and the intermediate piece 108, communicating via an opening 112 in the wall of the retaining nut with the low-pressure source containing the fuel supply pump 45.

This low-pressure chamber 114 communicates via a conduit 51 with an inlet opening 52 into the pump cylinder 102. The inlet opening 52 is opened by the pump piston 103 whenever the pump piston is located in the end position shown, at the end of the pump intake stroke. The pump work chamber 106 is then filled with fuel via the low-pressure source 45.

The pump work chamber also communicates continuously, in a manner not closable by the piston 103, with the relief conduit 53. The relief conduit communicates with the pump work chamber via a recess 54 on the end of the pump cylinder remote from the intermediate piece 108. The relief conduit leads to a magnetic valve 55, which controls the passage through the relief conduit. The relief conduit discharges into an annular chamber 56, which is coaxially penetrated by a valve closing member 57 of the magnetic valve. Coaxially with the closing member, the relief conduit leads out of the chamber 56 and on to the low-pressure source; the relief conduit 53 may optionally be directed via the low-pressure chamber 114, but direct communication with the supply pump 45 is also possible.

The outlet of the relief conduit out of the chamber 56 is embodied as a valve seat 58, on which the valve closing member 47, in the closing position, comes to rest with a corresponding sealing surface on its end face. In this position, the valve closing member, which may essentially be called a needle valve closing member, is in a state of pressure equilibrium; that is, the fuel arriving at high pressure in the chamber 56 from the pump work chamber 106 does not exert any substantial opening component upon the valve closing member. The valve closing member is conventionally actuated when the electromagnet, not shown here, is excited, and it may be loaded by a restoring spring 59.

Figure 4:
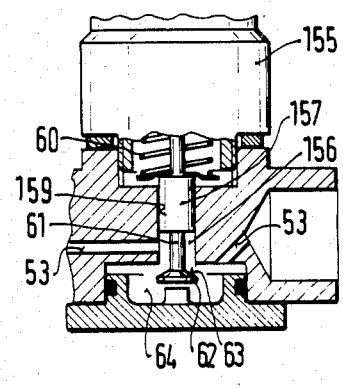
FIG. 4 shows a modified form of the magnetic valve of FIG. 3, intended for the third exemplary embodiment.

Instead of the embodiment of the magnetic valve shown in FIG. 3, this element may also be embodied like the magnetic valve 155 in a fragmentary section taken through a unit fuel injector shown in FIG. 4. Here, the valve closing member 157 is a slide-like element, which being tightly displaceable in a bore 159, is acted upon by a compression spring 60 on its end oriented toward the armature, not further shown here, of the electromagnet, and at the other end is connected via a tappet 61 with a valve plate 62. The valve plate 62 has a conically extending, annular sealing surface 63 pointing toward the valve closing member 157 and cooperating with a valve seat located at the outlet of the bore 159 leading into a relief chamber 64. In the closing position, the annular chamber 156 into which the relief conduit 53 discharges is formed between the piston-like portion of the valve closing member, the tappet 61 and the valve plate 62. The relief conduit then leads out of the relief chamber 64 and on to the low-pressure source. In the closing position, this valve closing member, too, is in a state of pressure equilibriun with respect to the high pressure in the pump work chamber or annular chamber 156.

As in the exemplary embodiment of FIG. 1, the pressure valve having the pressure valve closing member 21 is also provided in the intermediate piece 108. The closing member 21 monitors the passage of the injection line 16 from the pump work chamber to the injection valve 109. The spring chamber 44 enclosed by the rear side of the pressure valve closing member communicates with the low-pressure chamber 114 in the same manner as in the exemplary embodiment of FIG. 1.

During operation of the unit fuel injector, the pump work chamber 106, in the outset position shown, is filled with fuel; as described above, filling is effected via the inlet opening 52. In this condition, the magnetic valve is opened as well, so that continuous communication also exists from the pump work chamber via the relief conduit to the low-pressure source. It would also be provided to fill the pump work chamber 106 by this route, given an appropriate embodiment of the flow cross section at the magnetic valve. Upon the ensuing supply stroke of the pump piston, the opening 52 is closed, while the magnetic valve 55 initially is still open. During this stroke, up to the instant when the magnetic valve is closed in order to trigger the injection onset, the pum piston positively displaces fuel; because of the throttling of the valve seat 58, this causes an increase in the fuel pressure in the pump work chamber, beyond the level of the pressure in the low-pressure chamber 14. This pressure is exerted on the sealing surface of the valve closing member during the closing process of the magnetic valve, because this sealing surface area is located outside the surface area on the valve closing member. The resultant pressure therefore acts to counter the closing movement of the magnetic valve. The closing force of the magnet in the magnetic valve should be selected accordingly. During the closing process of the magnetic valve, the pressure present in the annular chamber 156 or in the chamber 56 can increase still further, because of the increasing throttling at the flow cross section of the relief conduit. This increase then acts counter to the pressure valve closing member 21, however. After an appropriate, selected opening pressure in the pump work chamber has been attained, the pressure valve closing member 21 rises from its seat and executes a deflecting movement, in which it receives all or part of the volume of fuel positively displaced by the pump piston. The pressure thereby arising in the injection line 16′ after the pressure valve closing member has opened does not yet exceed the opening pressure of the fuel injection valve. As a result, the further pressure increase is lessened substantially because of the deflecting movement of the pressure valve closing member 21, so that the closing member 57 or 157 can close without substantial hindrance. In this manner, the relief conduit passage can be controlled with a less-expensive magnetic valve and using less energ. The dimensions of the pressure valve closing member, in terms of its diameter, the restoring force of its valve spring 22, and the dimensions of the communication between the spring chamber 44 and the low-pressure chamber 14, as already explained in conjunction with FIG. 1, must be matched in this case to the stroke rate and the displacement volume of the pump piston 103, on the one hand, and to the cross sectional and surface area ratios of the valve closing member 57 or 157 on the magnetic valve, on the other. At the same time, the deflecting movement of the pressure valve closing member 21 should be adjusted by means of a stop 49. This stop determines the entire displacement volume that comes into play at the injection onset.

After the complete closure of the flow cross section of the relief conduit 53, the pressure in the pump work chamber 106 increases up to injection pressure, which causes the opening of the injection valve. The fuel continuing to be positively displaced by the pump piston then continues to attain injection until such time as the relief conduit 53 is once again opened by the magnetic valve. This causes a rapid drop in the pressure in the pump work chamber 106 and causes the closure of the pressure valve. If pressure waves appear in the injection line, then as explained earlier herein the pressure valve closing member 21 is briefly opened for relief purposes, via its pressure shoulder.

With the above embodiment, an exact control is attained of the injection onset and end, and thus at the same time of the fuel injection quantity per pump piston stroke. With the aid of the pressure valve closing member, a rapid and exact closure by the magnetic valve is also attained, with inexpensive apparatus and at a low energy cost.

In high-speed injection sequences, or at high engine rpm, it may happen, however, that at the moment the relief line 53 is opened by the magnetic valve, the pressure valve closing member may not be able to follow up the rapid pressure drop in the pump work chamber 106 quickly enough. As a consequence, the injection line 16 can also be severely emptied, so that at the moment of the closure of the communication with the pump work chamber the prevailing pressure may be variably low. In particular, variably pronounced deviations in this pressure state are possible, depending on dynamic conditions. In the ensuing supply stroke, a variable quantity of fuel must then be pumped into the injection line until the opening pressure of the fuel injection valve is attained in this line. On the one hand, this causes fluctuations in the fuel injection quantity, which is controlled by geometric definition, and on the other hand it can cause considerable pressure fluctuations in the high-pressure system, which impairs the resultant injection considerably. To prevent these variable pressure conditions in the injection line after the closure of the pressure valve closing member, the injection line is connected via an equalizing line 66 with the pump work chamber. The equalizing line leads from the chamber 18 into the pump cylinder 102, where it discharges at the level of the inlet opening 52. As soon as the pump piston 103 reaches bottom dead center in the outset position shown, the pump piston establishes communication between the pump work chamber 106 and the injection line 16′. Via the equalizing line, the pressure level in the injection line 16′ can then be brought to the supply pressure level. In the ensuing supply stroke, the equalizing line 66 is closed. Thus a constant pressure is always present in the injection line 16′, which prevents the above-mentioned fluctuations in the fuel injection quantity.

A different embodiment for attaining the object of the invention is shown in FIG. 5. Here, the chamber 18 communicates unclosably, via a throttle bore 67, with the pump work chamber 106. In this embodiment, the injection line 16′ between the pressure valve closing member 21 and the valve closing member of the injection valve is brought to the pressure of the low-pressure source or of the fuel supply source in the period while the pump piston 103 is at bottom dead center. The throttle is designed such that the pressure of the fuel supply source at rated rpm suffices to establish the pressure equilibrium in the injection line. At the beginning of supply by the pump piston, while the magnetic valve is still open, the pressure increases, corresponding to the pressure in the pump work chamber. The opening pressure of the pressure valve closing member should then be arranged to be such that the opening movement of the valve closing member begins upon the closure of the valve closing member 57 of the magnetic valve. The opening pressure is then exerted upon the entire cross section of the pressure valve closing member, that is, both on the pressure shoulder 23 and on the surface area of the pressure valve closing member defined by the sealing surface. This embodiment has the advantage that upon the opening of the pressure valve closing member, there is no pressure difference between the pump work chamber and the injection line 16', and thus no pressure fluctuation can be engendered.

A third embodiment for attaining pressure equilibrium in the injection line, even at high operating rpm of the fuel injection apparatus, is shown in FIG. 6. Here again, the valve seat 17 is provided in the injection line branching off from the pump work chamber 106, and the pressure valve closing member 21 comes to rest on this valve seat with its sealing surface 19. The sealing surface 19, like the seat, is conical and it is located on an integrally molded portion 24, which is adjacent to the pressure shoulder 23 of the portion of the pressure valve closing member that protrudes into the chamber 18. From the chamber 18, the injection line 16 leads on to the fuel injection valve. The guide cylinder 120 of the pressure valve closing member, in the present case, is closed on an end by the portion 68 having the larger diameter of a stepped piston 69 on the rear side of the pressure valve closing member, and the stepped piston and the pressure valve closing member together enclose the spring chamber 44, in which the valve spring 22 is also disposed, fastened in place between these two parts i.e., stepped piston and pressure valve closing member.

The end face of the larger portion 68 of the stepped piston serves as a stop 70 for the rear side of the pressure valve closing member. The stepped piston also has a shoulder, serving as a second stop 71, which is formed at the transition between the portion 68 of larger diameter and the portion 72 of smaller diameter of the stepped piston. This smaller portion plunges into a bore 74 that is coaxial with the guide bore 120; the bore 74 discharges into the valve spring chamber 28, known from FIG. 1, coaxially with this chamber. At the end face 75 of this chamber 28, the spring plate 29 comes to rest such that it serves as a bearing surface for the portion 72 of the stepped piston having the smaller diameter. The conduit 30 which joins the spring chamber 44 to the valve spring chamber 28 extends coaxially through the stepped piston 69 and the spring plate 29.

With the stepped piston, two partial strokes $h_1$ and $h_2$ of the pressure valve closing member can be realized. The first partial stroke $h_1$ is the one which the pressure valve closing member 21 executes counter to the force of the valve spring 22 until it contacts the stepped piston 69. In this position, on the one hand the stepped piston 69 rests on the valve plate 29 and on the other hand the valve plate 29 rests on the end face 75 of the chamber 28. Then, with increasing pressure being exerted on the pressure valve closing member, both parts, that is, the pressure valve closing member and the stepped piston, are displaced counter to the force of the valve closing spring 27, whereupon the valve plate 29 lifts from the end face 75 until the stepped piston, with its second stop 71, comes into contact with a corresponding shoulder 76 at the transition between the guide bore 120 and the bore 74. The pressure valve closing member 21 executes a second partial stroke $h_2$ in so doing. To adapt this movement characteristic as desired the conduit 30 can be provided with a throttle restriction, in particular a variable one. This can be done, for instance, by providing that the spring plate is divided into two parts, each having a through bore with the same eccentricity and having the diameter of the conduit 30. The flow cross section can then be varied by means of the mutual adjustment of the spring plate disks.

By means of this embodiment, it is attained that at the beginning of supply by the pump piston and when a first, low, opening pressure is attained, the pressure valve closing member 21 opens slightly, thereby effecting communication between the pump work chamber and the injection line 16'. In this operating phase, the injection line 16' can be pre-stressed to the pressure that prevails in the pump work chamber 106 before the closure of the magnetic valve. The second partial stroke $h_2$ is executed upon the closing process of the valve closing member 57 or 157 of the electromagnet, resulting in the above-described flattening effect on the rise in pressure. During the partial stroke $h_2$, the pressure valve closing member is acted upon over its entire surface area by the pressure in the pump work chamber 106, while prior to the beginning of the first partial stroke $h_1$, only the remaining surface area corresponding to the flow cross section to the pump work chamber is subjected to pressure. In accordance with this operating mechanism, the spring characteristics of the valve spring 22 and the valve closing spring 27 must be adapted with respect to the dimensioning of the diameter of the pressure valve closing member.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A fuel injection device for internal combustion engines comprising
   a pump housing that receives a pump cylinder and a reciprocally driven pump piston being guided therein,
   a pump work chamber defined by said pump piston within said pump cylinder,
   a fuel injection valve,
   a fuel injection line connectable at one end to the fuel injection valve which fuel injection line being arranged to be made to communicate with said pump work chamber at its other end,
   a pressure valve having a pressure valve closing member guided tightly in a guide cylinder, which pressure valve closing member defining at its rear side a spring chamber receiving a first spring to act upon said valve closing member, means for connecting said spring chamber with a relief chamber through which fuel under pressure that is variable in accordance with engine operating parameters acts upon said rear side of said pressure valve closing member, further said valve closing member being arranged to cooperate with stop means to thereby define the stroke of said valve closing member in said guide cylinder, said valve closing member further having a front side forming a sealing face matching with a valve seat which defines a flow cross section of said injection line, said front side further forming a pressure shoulder which joins said sealing face and defines part of a chamber which chamber is permanently connected to a part of said injection line between said injection valve and said valve seat, said pressure shoulder of said pressure valve closing member is acted upon by the pressure in said injection line between said injection valve and said valve seat of said pressure valve closing member, and a control valve (flow cross section control valve) which provides communication between said pump work chamber and a relief conduit upon the end of the effective supply stroke of said pump piston.

2. A fuel injection device as defined by claim 1, in which a volume which is enclosed on said rear side of said pressure valve closing member in said guide cylinder communicates via a controllable throttle with said relief chamber.

* * * * *